US007865769B2

(12) United States Patent
Luick

(10) Patent No.: US 7,865,769 B2
(45) Date of Patent: Jan. 4, 2011

(54) IN SITU REGISTER STATE ERROR RECOVERY AND RESTART MECHANISM

(75) Inventor: David Arnold Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 624 days.

(21) Appl. No.: 11/769,184

(22) Filed: Jun. 27, 2007

(65) Prior Publication Data

US 2009/0006905 A1 Jan. 1, 2009

(51) Int. Cl.
*G06F 11/00* (2006.01)

(52) U.S. Cl. .......................... 714/10; 714/17; 712/216; 712/227

(58) Field of Classification Search .................. 714/10, 714/17; 712/227, 216
See application file for complete search history.

(56) References Cited

U.S. PATENT DOCUMENTS 5,905,881 A * 5/1999 Tran et al. ................... 712/219
6,476,643 B2 * 11/2002 Hugues et al. ................ 326/93
6,785,842 B2 * 8/2004 Zumkehr et al. .............. 714/17
7,058,877 B2 * 6/2006 Tremblay et al. ............ 714/792
7,370,230 B1 * 5/2008 Flake ........................... 714/10
7,496,734 B1 * 2/2009 Richardson et al. ......... 712/217
7,512,772 B2 * 3/2009 Gschwind et al. ........... 712/227
7,555,692 B1 * 6/2009 Iacobovici ................... 714/746
2003/0163763 A1 * 8/2003 DeLano ....................... 714/15
2003/0182534 A1 * 9/2003 Harthcock ................... 712/34

* cited by examiner

*Primary Examiner*—Philip Guyton
(74) *Attorney, Agent, or Firm*—Patterson & Sheridan LLP

(57) ABSTRACT

Embodiments of the invention relate to methods and systems for error detection and recovery from errors during pipelined execution of data. A cascaded, delayed execution pipeline may be implemented to maintain a precise machine state. In some embodiments, a delay of one or more clock cycles may be inserted prior to a write back stage of each pipeline to facilitate error detection and recovery. Because a precise machine state is maintained error detection and recovery mechanisms may be built directly into register files of the system. If an error is detected execution of the instruction associated with the error and all subsequent instructions may be restarted.

16 Claims, 5 Drawing Sheets

IN SITU REGISTER STATE ERROR RECOVERY AND RESTART MECHANISM

BACKGROUND OF THE INVENTION

1. Field of the Invention

The present invention generally relates to pipelined data processing systems, and more specifically to error detection and recovery from errors during pipelined execution of data.

2. Description of the Related Art

Modern computer systems typically contain several integrated circuits (ICs), including a processor which may be used to process information in the computer system. The data processed by a processor may include computer instructions which are executed by the processor as well as data which is manipulated by the processor using the computer instructions. The computer instructions and data are typically stored in a main memory in the computer system.

Processors typically process instructions by executing each instruction in a series of small steps. In some cases, to increase the number of instructions being processed by the processor (and therefore increase the speed of the processor), the processor may be pipelined. Pipelining refers to providing separate stages in a processor where each stage performs one or more of the small steps necessary to execute an instruction. In some cases, the pipeline (in addition to other circuitry) may be placed in a portion of the processor referred to as the processor core. Some processors may have multiple processor cores.

As an example of executing instructions in a pipeline, when a first instruction is received, a first pipeline stage may process a small part of the instruction. When the first pipeline stage has finished processing the small part of the instruction, a second pipeline stage may begin processing another small part of the first instruction while the first pipeline stage receives and begins processing a small part of a second instruction. Thus, the processor may process two or more instructions at the same time.

Over the past few decades, the speed and density of transistors in integrated circuits has continued to increase in accordance with Moore's law, which predicts exponential growth. However, continuously decreasing feature sizes, reductions in supply voltages, and increased clock rates in modern processors has resulted in processors becoming increasingly susceptible to errors. For example, the possibility of errors in interprocessor communications has greatly increased, thereby necessitating error detection and recovery mechanisms.

Furthermore, as feature sizes shrink, the probability of encountering soft errors has also increased. Soft errors may be caused by external elements such as, for example, a charged particle striking a memory or memory type device and altering the contents of memory. For example, a cosmic ray may strike a register and alter the contents of the register by flipping one or more bits.

When instructions referring to vital registers altered by soft errors are executed, the execution of the instructions may result in potentially catastrophic effects. For example, executing instructions referring to registers altered by soft errors may result in an unintended effect on a computer system or may cause one or more other vital registers to be erroneously altered, thereby propagating the error and potentially resulting in system failure. Therefore, errors in registers must be detected, and propagation of errors to other registers must be avoided.

Furthermore, imprecise exceptions may occur when there are dependencies between instructions that execute out of order in different execution units. For example, out of order execution may result in the values of one or more registers being altered before another instruction is able to access the register, thereby resulting in unpredictable results and potentially catastrophic effects. This problem may be further exacerbated if the instruction altering the values of one or more registers is associated with a soft error condition, as described above. More importantly, out of order execution may result in an inability to determine the exact instruction and/or exact cycle during which an instruction failed, thereby precluding system recovery.

One solution to obviate erroneously changing register values may be to implement a recovery unit. A recovery unit may be configured to preserve the state of the contents of registers accessed in a pipeline. Therefore, if an erroneous update to a register is detected, the recovery unit may revert the system state to a previously saved non-erroneous state. For example, the recovery unit may restore the contents of a register to a previous non-erroneous value.

However, recovery units are very large and consume a significant amount of space in a processor. In some instances, a recovery unit may be as large as an execution unit, for example, a floating point unit. Such consumption of space in the processor is inefficient because, if available, the space may be used to add to the processing power of the processor.

Accordingly, there is a need for improved methods and systems for preserving the integrity of register contents and recovering from error conditions.

SUMMARY OF THE INVENTION

The present invention generally relates to pipelined data processing systems, and more specifically to error detection and recovery from errors during pipelined execution of data.

One embodiment of the invention provides a method for executing instructions. The method generally comprises executing an instruction group comprising at least a first instruction and a second instruction in a cascaded, delayed execution pipeline, wherein the execution of the second instruction in a second pipeline is delayed with respect to the execution of the first instruction in a first pipeline. The method further comprises preventing the write back of the execution results and execution of subsequent instructions in later program order than the executed instruction if an error is detected in a pipeline prior to write back of execution results of an executed instruction, and restarting execution of the executed instruction and the subsequent instructions.

Another embodiment of the invention provides another method for executing instructions. The method generally comprises executing an instruction group comprising at least a first instruction and a second instruction in a cascaded, delayed execution pipeline, wherein the execution of the second instruction in a second pipeline is delayed with respect to the execution of the first instruction in a first pipeline. The method further comprises delaying write back of execution results from each pipeline to one or more memory locations by one or more clock cycles, preventing the write back of the execution results and execution of subsequent instructions in later program order than the executed instruction if an error is detected in a pipeline prior to write back of execution results of an executed instruction, and restarting execution of the executed instruction and the subsequent instructions.

Yet another embodiment of the invention provides a processor, generally comprising one or more register files, each register in the register file comprising one or more error detection bits and a processor core comprising a plurality of execution pipelines. The processor is generally configured to execute an instruction group comprising at least a first instruction and a second instruction in the plurality of execution pipelines in a cascaded and delayed manner, wherein execution of the second instruction in a second pipeline is delayed with respect to the first instruction in a first pipeline. If an error is detected in a pipeline prior to write back of execution results of an executed instruction, the processor is further configured to prevent the write back of the execution results and execution of subsequent instructions in later program order than the executed instruction, and to restart execution of the executed instruction and the subsequent instructions.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
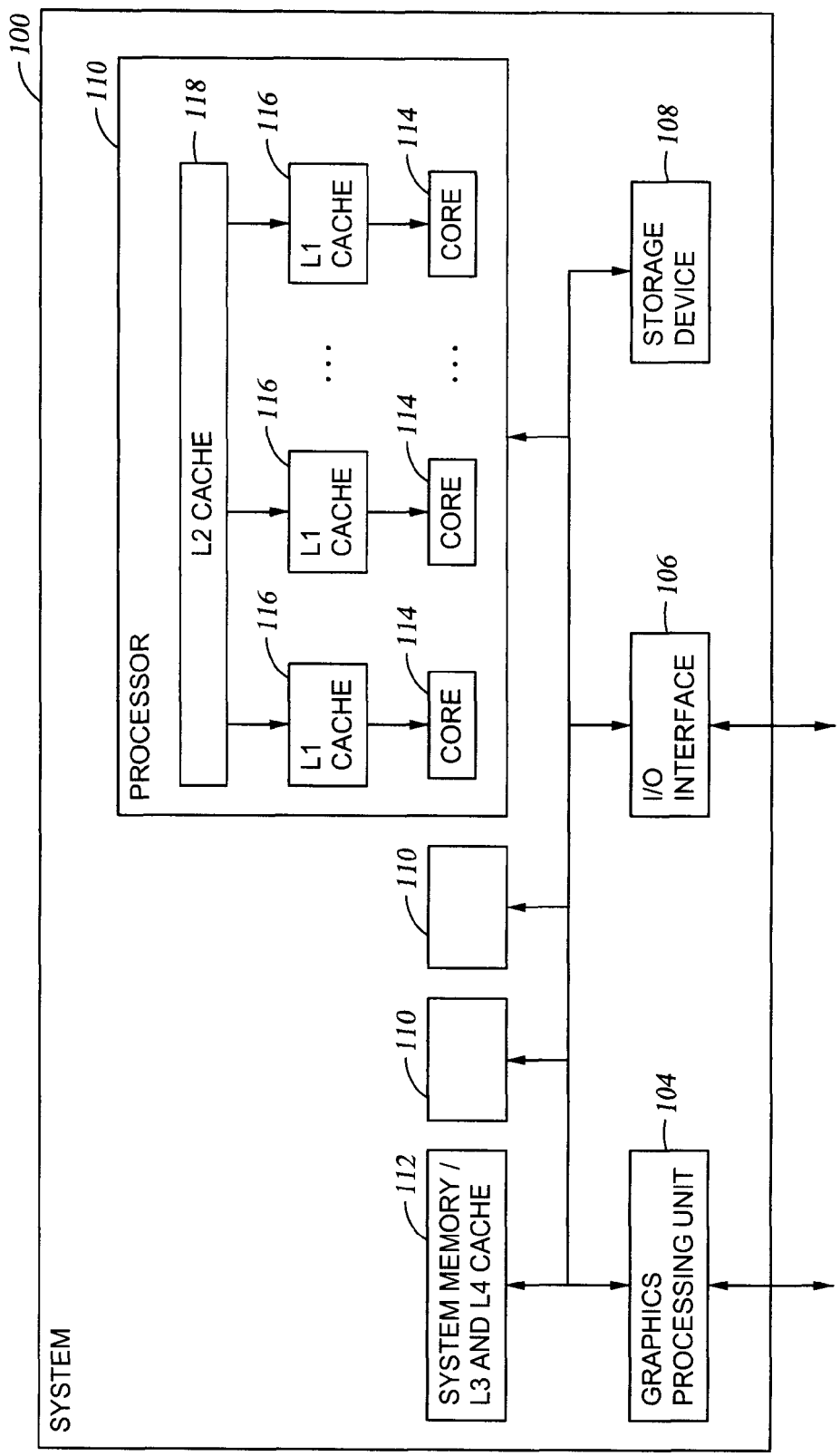
FIG. 1 illustrates an exemplary system according to an embodiment of the invention.

The present invention generally relates to pipelined data processing systems and, more specifically, to error detection and recovery from errors during pipelined execution of data. Embodiments of the invention implement a cascaded, delayed execution pipeline to maintain a precise machine state. In some embodiments, a delay of one or more clock cycles may be inserted prior to a write back stage of the pipeline to facilitate error detection and recovery. Because a precise machine state is maintained error detection and recovery mechanisms may be built directly into register files of the system. If an error is detected, execution of the instruction associated with the error and all subsequent instructions may be restarted.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Embodiments of the invention may be utilized with and are described below with respect to a system, e.g., a computer system. As used herein, a system may include any system utilizing a processor and a cache memory, including a personal computer, internet appliance, digital media appliance, portable digital assistant (PDA), portable music/video player and video game console. While cache memories may be located on the same die as the processor which utilizes the cache memory, in some cases, the processor and cache memories may be located on different dies (e.g., separate chips within separate modules or separate chips within a single module).

Exemplary System

FIG. 1 illustrates an exemplary system 100 according to an embodiment of the invention. As illustrated system 100 includes a plurality of processors 110, L3 cache/L4 cache/memory 112, graphics processing unit (GPU) 104, input/output (IO) interface 106, and a storage device 108. The memory 112 is preferably a random access memory sufficiently large to hold the necessary programming and data structures operated on by processor 110. While memory 112 is shown as a single entity, it should be understood that memory 112 may in fact comprise a plurality of modules, and that memory 112 may exist at multiple levels, for example, L3 cache, L4 cache, and main memory.

Storage device 108 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 108 could be part of one virtual address space spanning multiple primary and secondary storage devices.

IO interface 106 may provide an interface between the processors 110 and an input/output device. Exemplary input devices include, for example, keyboards, keypads, light-pens, touch-screens, track-balls, or speech recognition units, audio/video players, and the like. An output device can be any device to give output to the user, e.g., any conventional display screen.

Graphics processing unit (GPU) 104 may be configured to receive graphics data, for example, 2-Dimensional and 3-Dimensional graphics data, from a processor 110. GPU 104 may perform one or more computations to manipulate the graphics data, and render images on a display screen.

Processor 110 may include a plurality of processor cores 114. Processors cores 114 may be configured to perform pipelined execution of instructions retrieved from memory 112. Each processor core 114 may have an associated L1 cache 116. Each L1 cache 116 may be a relatively small memory cache located closest to an associated processor core 114 and may be configured to give the associated processor 114 fast access to instructions and data (collectively referred to henceforth as data).

Processor 110 may also include at least one L2 cache 118. An L2 cache 118 may be relatively larger than a L1 cache 114. Each L2 cache 118 may be associated with one or more L1 caches, and may be configured to provide data to the associated one or more L1 caches. For example a processor core 114 may request data that is not contained in its associated L1 cache. Consequently, data requested by the processor core 114 may be retrieved from an L2 cache 118 and stored in the L1 cache 116 associated with the processor core 114. In one embodiment of the invention, L1 cache 116, and L2 cache 118 may be SRAM based devices. However, one skilled in the art will recognize that L1 cache 116 and L2 cache 118 may be any other type of memory, for example, DRAM.

If a cache miss occurs in an L2 cache 118, data requested by a processor core 110 may be retrieved from an L3 cache 112. L3 cache 112 may be relatively larger than the L1 cache 116 and the L2 cache 118. While a single L3 cache 112 is shown in FIG. 1, one skilled in the art will recognize that a plurality of L3 caches 112 may also be implemented. Each L3 cache 112 may be associated with a plurality of L2 caches 118, and may be configured to exchange data with the associated L2 caches 118. One skilled in the art will also recognize that one or more higher levels of cache, for example, L4 cache may also be included in system 100. Each higher level cache may be associated with one or more caches of the next lower level.

Figure 2:
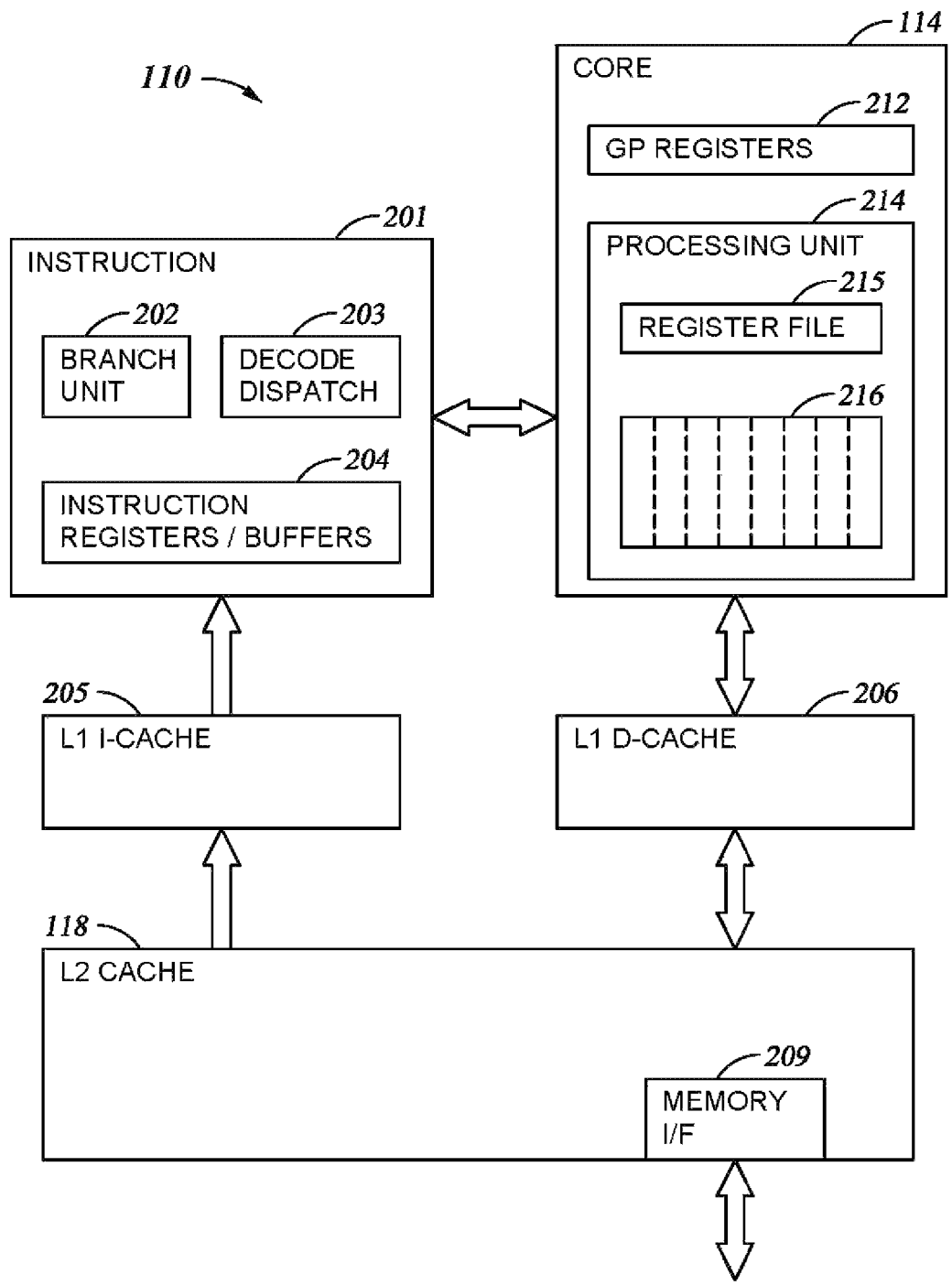
FIG. 2 illustrates a detailed view of an exemplary processor according to an embodiment of the invention.

FIG. 2 is a more detailed diagram of components of processor 110 according to an embodiment of the invention. The components of processor 110 illustrated in FIG. 2 may be packaged in a single semiconductor chip. Processor 110 may include an instruction unit 201, processor core 114, Level 1 Instruction Cache (L1 I-Cache) 205, Level 1 Data Cache (L1 D-Cache) 206, Level 2 Cache (L2 Cache) 118, and memory interface 209. L1 I-Cache 205 and L1 D-Cache 206 may be components of L1 Cache 116 of FIG. 1.

In general, instruction unit 201 may obtain instructions from L1 I-cache 205, decode instructions to determine operations to perform, and resolve branch conditions to control program flow. Processor core 114 may perform arithmetic and logical operations on data in one or more registers, and load or store data from L1 D-Cache 206. L2 Cache 118 may provide instructions/data to L1 I-Cache 205 and L1 D-Cache 206, as illustrated in FIG. 2. L2 Cache 118 may be coupled with external memory interface 209, which may load data from or store it to an external memory location, which is generally main memory 112, although it could be another level of cache.

Instruction unit 201 may include a branch unit 202, instruction decode/dispatch unit 203, and instruction registers and buffers 204. Instructions from L1 I-cache 205 may be loaded into buffers 204 prior to execution. Depending on the CPU design, there may be multiple buffers (e.g., one for a sequential series of instructions, and others for branch-to locations), each of which may contain multiple instructions. Decode/dispatch unit 203 may receive the current instruction to be executed from one of the buffers, and decode the instruction to determine the operation(s) to be performed or branch conditions. Branch unit 202 may control the program flow by evaluating branch conditions, and refills buffers from L1 I-cache 205.

L1 I-cache 205 and L1 D-cache 206 may be separate instruction and data caches providing data to instruction and execution units. L2 cache may be a non-discriminated cache containing both instructions and non-instruction data. Data may be taken from or stored to an L1 cache by the instruction or execution unit, and if the data is unavailable in an L1 cache, it may be loaded into the L1 cache from L2 cache 208, which in turn may obtain it from main memory 112, and then transferred from L1 cache to the corresponding unit. Depending on the processor design, it may be possible to by-pass L1 cache and load data from L2 cache 118 to an execution or instruction register. Memory bus interface 209 may handle the transfer of data across memory bus 103, which may be to main memory or to I/O units.

Processor core 114 may include a set of general purpose (GP) registers 212 for storing data and a processing subunit 214 for performing one or more operations in response to instructions decoded by instruction unit 201. Processing unit 214 may include a set of registers 215, and a set of parallel pipelines 216 for operating on data in registers 215. Processing unit 214 and its components are described in greater detail herein.

In addition to components shown in FIG. 2, processor core 114 may include additional special purpose registers and counters, load and store hardware for fetching data from or storing it to cache or memory, control hardware, and so forth.

Pipelines 216 may include one or more arithmetic pipelines configured to perform arithmetic operations, for example, floating point calculations and fixed point calculations. Pipelines 216 may contain one or more load/store pipelines for transferring data between GP registers 212 or registers 215 on the one hand and some form of memory (generally L1 D-Cache or L2 Cache) on the other. Additional pipelines, such as an instruction fetch and decode pipeline, may also exist within processor core 114.

While various components of processor 110 have been described and shown at a high level, it should be understood that the processor of the preferred embodiment contains many other components not shown, which are not essential to an understanding of the present invention. For example, various additional special purpose registers will be required in a typical design. Furthermore, it will be understood that the processor of FIG. 2 is simply one example of a processor architecture, and that many variations could exist in the number, type and arrangement of components within processor 110, that components not shown may exist in addition to those depicted, and that not all components depicted might be present in a processor design. For example, the number and configuration of buffers and caches may vary; the number and function of execution unit pipelines may vary; registers may be configured in different arrays and sets; dedicated floating point hardware may or may not be present; etc.

Cascaded Delayed Execution Pipeline

As discussed earlier, one challenge is that the execution of instructions may complete out of order, i.e. imprecisely, in one or more pipelines of a processor core. Therefore, if an error occurs in the pipeline, recovery from the error condition may be precluded because it may not be possible to determine the exact instruction causing the error, and the exact clock cycle in which the error occurs. Embodiments of the invention, however, may reduce the possibility of imprecise exceptions by implementing a cascaded, delayed execution pipeline configuration.

Figure 3:
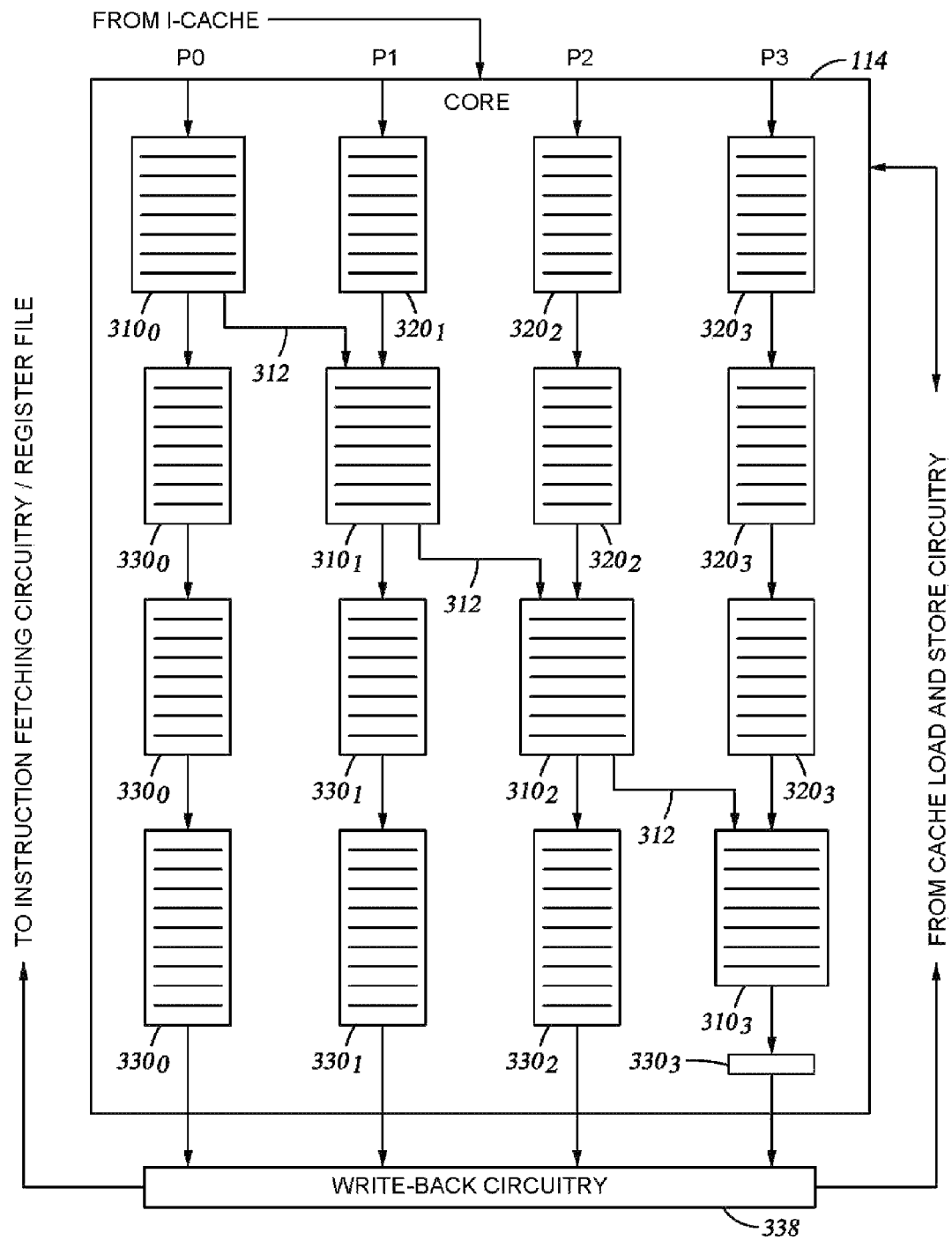
FIG. 3 illustrates an exemplary cascaded delayed execution pipeline according to an embodiment of the invention.

FIG. 3 illustrates four exemplary pipelines in a cascaded configuration, according to an embodiment of the invention. The pipelines illustrated in FIG. 3 may correspond to the pipelines 216 of FIG. 2. While four pipelines are illustrated in FIG. 3, one skilled in the art will recognize that a smaller number (two or more pipelines) or a larger number, for example, eight pipelines, may be used in such a configuration.

Furthermore, the physical layout of the pipeline depicted in FIG. 3 is exemplary, and not necessarily suggestive of an actual physical layout of the cascaded, delayed execution pipeline unit.

In one embodiment, each pipeline (P0, P1, P2, P3) illustrated in FIG. 3 in the cascaded, delayed execution pipeline configuration may contain an execution unit 310. The execution unit 310 may be, for example, an FX unit, LS unit, FP unit, and the like. The execution unit 310 may contain several pipeline stages which perform one or more functions for a given pipeline. For example, the execution unit 310 may perform all or a portion of the fetching and decoding of an instruction. The decoding performed by the execution unit may be shared with a predecoder and scheduler which is shared among multiple cores 114 or, optionally, which is utilized by a single core 114. As described above, the execution unit may also read data from a register file, calculate addresses, perform integer arithmetic functions (e.g., using an arithmetic logic unit, or ALU), perform floating point arithmetic functions, execute instruction branches, perform data access functions (e.g., loads and stores from memory), and store data back to registers (e.g., in one of register files 212 or 214).

In one embodiment, each execution unit 310 may perform the same functions. Optionally, each execution unit 310 (or different groups of execution units) may perform different sets of functions. Also, in some cases the execution units 310 in each core 114 may be the same or different from execution units 310 provided in other cores. For example, in one core, execution units $310_0$ and $310_2$ may perform load/store and arithmetic functions while execution units $310_1$ and $310_3$ may perform only arithmetic functions.

In one embodiment, as depicted, execution in the execution units 310 may be performed in a delayed manner with respect to the other execution units 310. The depicted arrangement may also be referred to as a cascaded, delayed configuration, but the depicted layout is not necessarily indicative of an actual physical layout of the execution units. Instructions in a common issue group (e.g., instructions I0, I1, I2, and I3) may be issued in parallel to the pipelines P0, P1, P2, P3, with each instruction being executed in a delayed fashion with respect to each other instruction. For example, instruction I0 may be executed first in the execution unit $310_0$ for pipeline P0, instruction I1 may be executed second in the execution unit $310_1$ for pipeline P1, and so on.

In such a configuration, where instructions in a group executed in parallel are not required to issue in program order (e.g., if no dependencies exist between instructions they may be issued to any pipe) all instruction groups are assumed to be executed in order for the previous examples. However, out of order execution across groups is also allowable for other exemplary embodiments. In out of order execution, the cascade delayed arrangement may still provide similar advantages. However, in some cases, it may be decided that one instruction from a previous group may not be executed with that group. As an example, a first group may have three loads (in program order: L1, L2, and L3), with L3 dependent on L1, and L2 not dependent on either. In this example, L1 and L3 may be issued in a common group (with L3 issued to a more delayed pipeline), while L2 may be issued "out of order" in a subsequent issue group.

In one embodiment, upon issuing the issue group to the processor core 114, I0 may be executed immediately in execution unit $310_0$. Later, after instruction I0 has finished being executed in execution unit $310_0$, execution unit $310_1$ may begin executing instruction I1, and so on, such that the instructions issued in parallel to the core 114 are executed in a delayed manner with respect to each other.

In one embodiment, some execution units 310 may be delayed with respect to each other while other execution units 310 are not delayed with respect to each other. Where execution of a second instruction is dependent on the execution of a first instruction, forwarding paths 312 may be used to forward the result from the first instruction to the second instruction. The depicted forwarding paths 312 are merely exemplary, and the core 114 may contain more forwarding paths from different points in an execution unit 310 to other execution units 310 or to the same execution unit 310.

In one embodiment, instructions which are not being executed by an execution unit 310 (e.g., instructions being delayed) may be held in a delay queue 320 or a target delay queue 330. The delay queues 320 may be used to hold instructions in an instruction group which have not yet been executed by an execution unit 310. For example, while instruction I0 is being executed in execution unit $310_0$, instructions I1, I2, and I3 may be held in a delay queue 320. Once the instructions have moved through the delay queues 320, the instructions may be issued to the appropriate execution unit 310 and executed. The target delay queues 330 may be used to hold the results of instructions which have already been executed by an execution unit 310. In some cases, results in the target delay queues 330 may be forwarded to executions units 310 for processing or invalidated where appropriate. Similarly, in some circumstances, instructions in the delay queue 320 may be invalidated, as described below.

In one embodiment, after each of the instructions in an instruction group have passed through the delay queues 320, execution units 310, and target delay queues 330, the results (e.g., data, and, as described below, instructions) may be written back either to a register file or the L1 I-cache and/or D-cache. In some cases, write-back circuitry 338 may be used to write back the most recently modified value of a register (received from one of the target delay queues 330) and discard invalidated results.

The cascaded delayed execution of instructions in the pipeline may ensure that instructions are executed in a precise manner. In other words, delaying execution of dependent instructions of an instruction group with respect to each other, across the various execution units in the processor core, may ensure that the instructions complete execution in order, thereby reducing the probability of imprecise exceptions. Avoiding the occurrence of imprecise exceptions may allow recovery from errors in the pipeline because the exact instruction causing an error condition may be determined. The detection of error conditions and recovery therefrom is described in greater detail below.

In Situ Error Detection and Recovery

Figure 4:
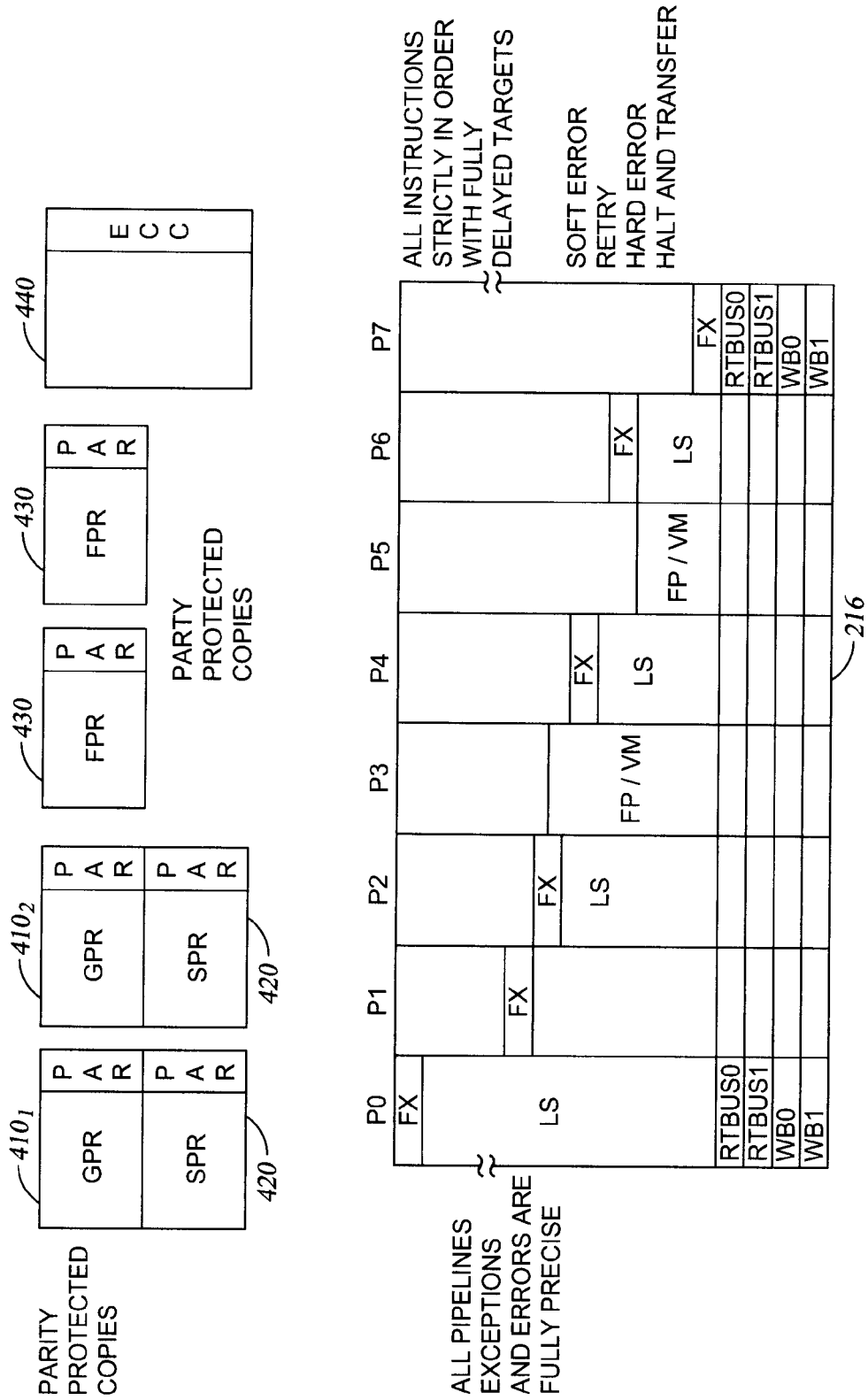
FIG. 4 illustrates exemplary components of a processor core according to an embodiment of the invention.

FIG. 4 illustrates a more detailed view of processor core 114 according to an embodiment of the invention. As illustrated in FIG. 4, processor core 114 may include a plurality of register files. For example, a pair of general purpose register files 410, a pair of special purpose register files 420, a pair of floating point register files 430, and optional checkpoint registers 440 are illustrated in FIG. 4. General purpose register files 410 may correspond to general purpose registers 212, and floating point registers 420 and checkpoint registers 430 may correspond to registers 215 in FIG. 2.

General purpose register files 410 may be configured to store both data and addresses associated with instructions processed by processor core 114. Special purpose registers 420 may be configured to store program state information, for example, program counters, stack pointers, status information, and the like. Floating point registers may be configured to store floating point numbers.

Checkpoint registers 440 may store a system state of a previous checkpoint. For example, checkpoint registers may maintain a copy of register values that were computed after the completion of a checkpoint instruction of a particular program. Therefore, if an error is encountered in subsequent instructions, the program state may be restored to the checkpoint state, and execution restarted from the checkpoint instruction to recover from the error condition. Therefore, by resuming execution from a previous checkpoint state, the performance penalty for recovering from an error condition may be limited.

A detailed view of pipelines 216 is also illustrated in FIG. 4. Each of pipelines P0-P7 of the pipelines 216 may contain one or more execution units. For example, P0, P2, and P4, and P6 may each contain a fixed point (FX) unit and a Load/Store (LS) unit. The FX units in pipelines P0, P2, and P4, and P6 may be configured to compute an address associated with data, for example, the address of a location in cache or memory. The LS unit may be configured to read data from or write data to a location in cache or memory.

In one embodiment, pipelines P1 and P7 may each include a fixed point (FX) units configured to perform integer arithmetic, logical operations, shifts, rotates, compares, and like operations. Pipelines P2 and P5 are shown comprising floating point (FP) units. A floating point unit may perform arithmetic operations, for example, addition, subtraction, multiplication, division, square root, and the like, on floating point numbers.

One skilled in the art will recognize that the configuration of the pipelines in FIG. 4 is provided for illustrative purposes only, and that the particular configuration of pipelines and the execution unite therein may vary. For example, any combination of fixed, floating point, and/or vector units may be placed in each of the plurality of pipelines 216. Furthermore, the execution of instructions in the pipelines may be performed as discussed herein and in U.S. patent application Ser. No. 11/608,988, entitled CASCADED DELAYED EXECUTION PIPELINE, filed Dec. 11, 2006, by David A. Luick. This patent application is herein incorporated by reference in its entirety.

In one embodiment of the invention, pipelines P0-P7 may be in the cascaded, delayed execution configuration described above in conjunction with FIG. 3. By ensuring a precise machine state, for example, by implementing the cascaded, delayed execution pipeline described above, embodiments of the invention may permit error detection and recovery mechanisms to be built directly into the register files, thereby obviating the need for recovery unit and saving valuable space in a processor 110.

For example, in one embodiment of the invention, one or more register sets may be duplicated to provide redundant storage of data. In other words, the data stored in a first register file may also be stored in an associated second register file (referred to as a redundant register file). The first and the second register files may include a parity bit for detecting errors, for example, soft errors, in the registers included in the register file. If the parity bit indicates an error when a value is read from a register of a register file, the desired value may be derived from an associated register in the redundant register file. Therefore, register file duplication may provide for error recovery when soft errors are encountered.

Referring to FIG. 4, each of the general purpose register file, special purpose register file, and floating point register file are shown comprising an associated redundant (i.e., duplicate) register file. In other words, each pair of register files may store the same data to provide data redundancy for detecting soft errors. For example, both general purpose register files 410₁ and 410₂ may contain the same data. Therefore, if a parity error is detected in the contents of a register in a first general purpose register file 410₁, the register contents may be derived from a corresponding register in the redundant general register file 410₂.

Alternatively, to facilitate error detection and correction, one or more register files may include Error Correction Code (ECC). ECC may allow detection and correction of errors in registers or a memory location. ECC may be used for detection and correction of single bit or multi bit errors. Referring to FIG. 4, checkpoint register file 440 is shown with ECC bits to facilitate detection and correction of errors, for example, soft errors.

While register file duplication and ECC are described herein, one skilled in the art will recognize that embodiments of the invention are not limited to the aforementioned error detection schemes. Any reasonable error detection and/or recovery scheme known in the art, for example, special hardware for detecting invalid machine states may also be used.

In one embodiment of the invention, error checking and correction mechanisms may be built into each of pipelines 216. The error checking mechanisms may determine whether one or more values in a register are erroneous, for example, by checking the parity bit or the ECC code. If it is determined that one or more values of a register associated with the instruction executing in a respective pipeline are erroneous, an appropriate error recovery action may be taken. For example, a redundant register file may be accessed to retrieve the correct register contents, or the ECC code may be used to correct the register contents.

In one embodiment of the invention, if an error is detected in a pipeline, execution of the instruction executing in the pipeline, and execution of all subsequent instructions may be stopped. For example, if an error is detected in pipeline P3 in FIG. 4, execution of the instruction executing in pipelines P3 may be stopped. If instructions subsequent to the instruction executing in P3 are being executed in pipelines P4-P7, the execution of instructions in P4-P7 may also be stopped. The correct values for the instruction executing in pipeline P3 may be retrieved, for example, from a redundant register file, and the execution of the instruction and the subsequent instructions may be restarted.

In one embodiment of the invention, the write back of results of execution for an instruction associated with an error, and subsequent instructions may be inhibited. To prevent write back, the results of execution may be invalidated, or an invalidate signal may be sent to the register file to prevent latching of erroneous results. For example, in the previous example, if an error is detected in P3, the write back of register results from pipeline P3 may be invalidated to prevent erroneous data from being written to the register files.

While invalidation of write back to a register file is described herein, one skilled in the art will recognize that the same concept may be used to invalidate write back of execution results to memory. For example, an invalidate signal may be sent to memory to prevent storing of erroneous results in a cache.

In one embodiment of the invention, if an error is detected in one pipeline, execution of all instructions subsequent to the first instruction in the pipelines 216 may also be stopped. Thereafter, execution of the first instruction and subsequent instructions may be restarted. In one embodiment, execution of the first instruction and subsequent instructions after an error may be restarted in a different core 114.

Delaying Writeback

In one embodiment of the invention, at the end of execution of an instruction group in a pipeline, for example, the cascaded, delayed execution pipelines 216 of FIG. 4, a delay of one or more clock cycles may be inserted prior to writing the results of execution back to registers or memory. Providing the delay of one or more clock cycles may allow for error detection and may prevent the altering of registers in the register files with erroneous execution results. Therefore, the integrity of the register file may be maintained and propagation of error condition and system failure may be avoided.

For example, referring to FIG. 4, the execution of all instructions of an instruction group executing in the pipelines 216 is illustrated. Writing back of the results of execution to registers or memory may be delayed by one or more clock cycles to facilitate detection of errors and prevent register values from being incorrectly altered. For example, in FIG. 4, two delay cycles RTBUS0 and RTBUS1 are shown prior to write back stages WB0 and WB1. The delay cycles RTBUS0 and RTBUS1 may be implemented by using, for example, a delay queue 330 illustrated in FIG. 3.

In one embodiment of the invention, if an error is detected during RTBUS0 or RTBUS1, the write back of results to registers or memory may be invalidated. For example, the results in a delay queue 330 may be invalidated. Alternatively, an invalidate signal may be sent to a register in a register file or to a memory location to prevent latching of incorrect values during write back stages WB0 and WB1. In one embodiment, the invalidate signal may be sent over a relatively larger wire using a high drive current. By providing a relatively larger wire and high drive, the invalidate signal may be sent relatively more quickly to invalidate write back of erroneous results.

As an example, a first instruction may execute in pipeline P7. A second instruction following the first instruction, and dependent on the first instruction, may be executed in P0 in a following clock cycle. The second instruction may depend on the results of the first instruction. If an erroneous set of results is computed during execution of the first instruction, the error in the results may be detected during the RTBUS0 and RTBUS1 cycles. Therefore, the results from the first instruction may be invalidated and may not be written back to registers or memory. Therefore, the execution of the second instruction with erroneous results may be avoided.

In one embodiment of the invention, register values accessed in a given pipeline may be latched at a redundant location, for example, in a latch or a data save register. Therefore, if a register value is incorrectly altered, the previous value of the register may be restored in the register using the redundant location. For example, an instruction may access a value in a register. At or near the time of dispatch of the register value to the pipeline executing the instruction, the register value may also be stored in a redundant location for example in a latch or a data save register.

After execution of the instruction, the register value the results of execution may be stored to the register, thereby altering the register results. If it is determined that the exception has occurred the previous value of the register, stored in the redundant location, may be used to restore the register value. For example, if an imprecise exception occurs, data stored in a register may be invalid. Therefore, a correct value of data preserved in the redundant location may be used to restore the register contents to a previous, valid state. Methods and systems for implementing redundant locations is described in greater detail in U.S. Pat. Nos. 5,793,944; 5,875,346; and 6,065,107.

Figure 5:
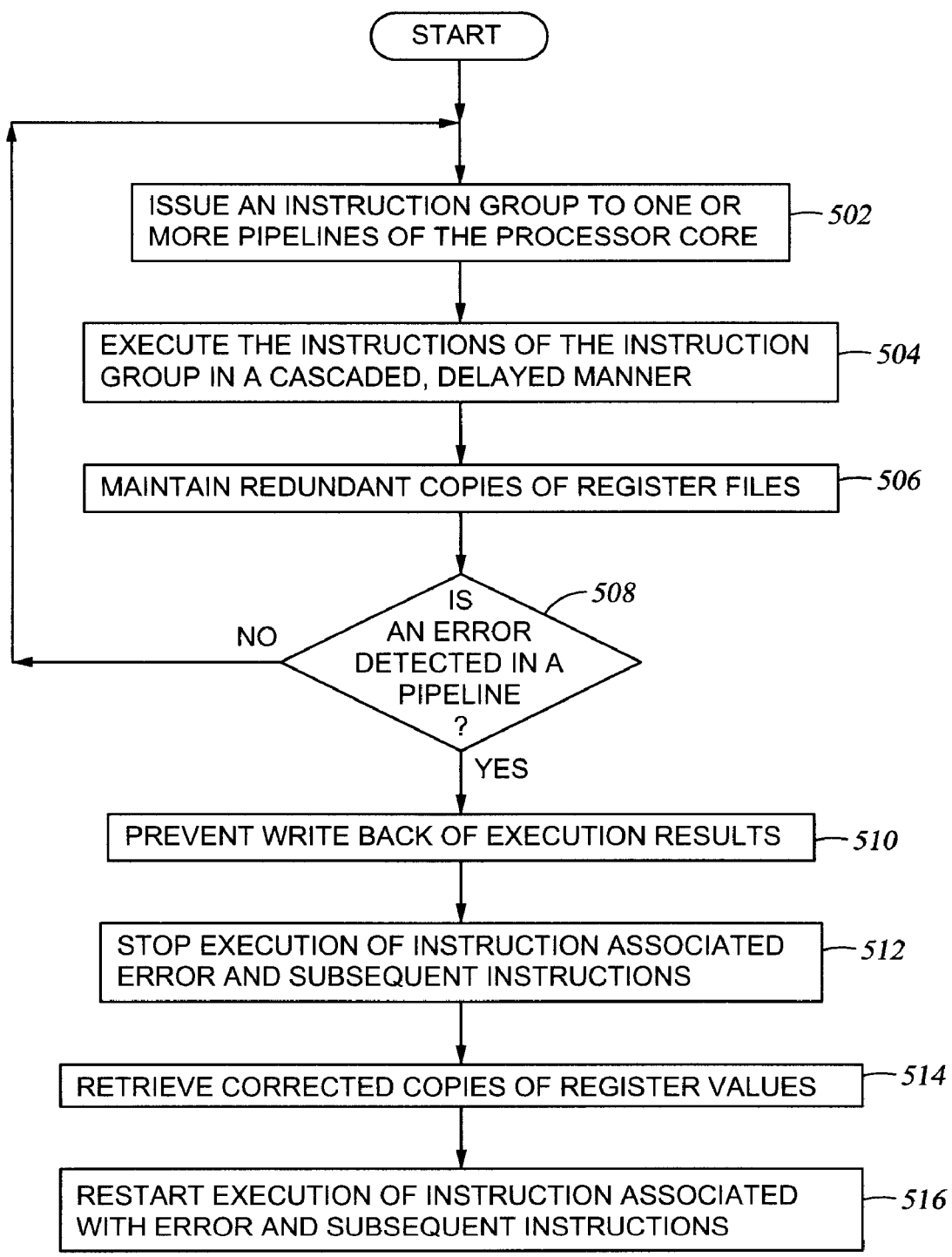
FIG. 5 is a flow diagram of exemplary operations performed in a processor core for executing instructions according to an embodiment of the invention.

FIG. 5 is a flow diagram of exemplary operations performed in a processor core for executing instructions according to an embodiment of the invention. The operations may begin in step 502 by issuing an instruction group to one or more pipelines in the processor core. For example, referring to FIG. 4, an instruction of an instruction group may be issued to each of pipelines P0-P7. In step 504, the instructions may be executed in the pipelines in a cascaded, delayed execution manner, as described above. For example, the execution of a first instruction of the instruction group may be delayed with respect to a second instruction of the instruction group.

In step 506, a redundant copy of the registers may be maintained in the processor core. For example, referring to FIG. 4, general purpose registers 410, special purpose registers 420, and floating point registers 430 are duplicated to provide redundancy. Alternatively, in some embodiments, a register file may include ECC bits to facilitate error detection and recovery.

In step 508, if an error is identified in one or more pipelines during execution of an instruction, the write back of execution results for the instruction receiving the error and subsequent instructions may be prevented in step 510. For example, a register value being processed in a pipeline may have a soft error. If an error is detected, the execution results contained in a target delay queue 330 may be invalidated. Alternatively, an invalidate signal may be sent to a register file to prevent latching of execution results in a register of the register file.

In step 512, execution of the instruction receiving the error and subsequent instructions may be stopped. In step 514, corrected copies of register values may be retrieved. For example, a redundant register file may be accessed or the ECC bits for a register may be used to correct an error in a register associated with the instruction receiving the error. Thereafter, execution of the instruction receiving the error and subsequent instructions may be restarted with the corrected register values, in step 516. In one embodiment, execution may be restarted in a different processor core.

As described above, in one embodiment, write back of execution results from each pipeline may be delayed by one or more clock cycles. Delaying write back of execution results may allow errors to be detected before erroneous execution results are used to alter one or more memory locations, for example, a register file or cache.

CONCLUSION

By implementing a cascaded, delayed execution pipeline with a target write delay, embodiments of the invention reduce the possibility of imprecise exceptions. Furthermore, because a precise machine state is maintained, error detection and recovery mechanisms can be built directly into register files, thereby obviating the need for a recovery unit.

While the foregoing is directed to embodiments of the present invention, other and further embodiments of the invention may be devised without departing from the basic scope thereof, and the scope thereof is determined by the claims that follow.

What is claimed is:

1. A method for executing instructions, the method comprising:

executing an instruction group comprising at least a first instruction and a second instruction in cascaded, delayed execution pipelines comprising at least a first pipeline and a second pipeline, wherein execution of the second instruction in the second pipeline is delayed with respect to execution of the first instruction in the first pipeline by storing the second instruction in a first delay buffer during execution of the first instruction, and wherein execution results of the first instruction are forwarded to the second pipeline; and if an error is detected in a pipeline prior to write back of execution results of an executed instruction, preventing the write back of the execution results and execution of subsequent instructions in later program order than the executed instruction, and restarting execution of the executed instruction and the subsequent instructions.

2. The method of claim 1, further comprising delaying write back of execution results from each pipeline to one or more memory locations by one or more clock cycles.

3. The method of claim 2, wherein delaying write back of execution results from each pipeline to one or more memory locations comprises storing the execution results in at least one second delay buffer.

4. The method of claim 3, wherein preventing write back of execution results comprises invalidating execution results stored in one or more of the at least one second delay buffer.

5. The method of claim 1, wherein preventing write back of execution results comprises sending an invalidate signal to a target register in at least one register file, and wherein the invalidate signal is configured to prevent the target register from latching the execution results.

6. The method of claim 1, wherein detecting an error in a pipeline comprises checking a parity bit associated with data being processed in the pipeline, and wherein resolving the error comprises consulting a redundant register file.

7. The method of claim 1, wherein detecting an error in a pipeline comprises checking an error correction code (ECC) associated with data being processed in the pipeline.

8. A processor comprising:
at least one register file, each register in the at least one register file comprising at least one error detection bit; and
a processor core comprising a plurality of execution pipelines, wherein the processor core is configured to:
execute an instruction group comprising at least a first instruction and a second instruction in the plurality of execution pipelines in a cascaded and delayed manner, wherein execution of the second instruction in a second pipeline is delayed with respect to execution of the first instruction in a first pipeline by storing the second instruction in a first delay buffer during execution of the first instruction, and wherein execution results of the first instruction are forwarded to the second pipeline; and if an error is detected in a pipeline prior to write back of execution results of an executed instruction, prevent the write back of the execution results and execution of subsequent instructions in later program order than the executed instruction, and restart execution of the executed instruction and the subsequent instructions.

9. The processor of claim 8, wherein the processor core is further configured to delay write back of execution results from one or more of the plurality of execution pipelines to the at least one register file by one or more clock cycles.

10. The processor of claim 9, wherein the processor core is configured to delay write back of execution results from one or more of the plurality of execution pipelines to the at least one register file by storing the execution results in at least one second delay buffer.

11. The processor of claim 10, wherein the processor core is configured to prevent write back of execution results by invalidating execution results stored in one or more of the at least one second delay buffer.

12. The processor of claim 8, wherein the at least one error detection bit comprises at least one parity bit for detecting an error in contents of a register in the at least one register file.

13. The processor of claim 8, further comprising a redundant register file for storing a redundant copy of one or more of the at least one register file.

14. The processor of claim 8, wherein the at least one error detection bit comprises at least one error correction code (ECC) bit for detecting an error in contents of a register in the at least one register file.

15. The processor of claim 8, wherein the processor core is further configured to detect an error in one or more of the plurality of execution pipelines by checking the at least one error detection bit associated with data received from one or more registers in the at least one register file.

16. The processor of claim 8, wherein the processor core is further configured to prevent write back of execution results by sending an invalidate signal to a target register in the at least one register file, and wherein the invalidate signal is configured to prevent the target register from latching the execution results.

* * * * *